Patented Apr. 2, 1929.

1,707,217

UNITED STATES PATENT OFFICE.

EDMUND BREUNING, OF HAGEN, GERMANY, ASSIGNOR TO THE ELECTRIC STORAGE BATTERY COMPANY, OF PHILADELPHIA, PENNSYLVANIA, A CORPORATION OF NEW JERSEY.

PROCESS FOR OBTAINING THIN NICKEL FLAKES.

No Drawing. Application filed June 28, 1927. Serial No. 202,159, and in Germany July 10, 1926.

To obtain nickel flakes out of compound metallic sheeting consisting of alternating layers of copper and nickel it has been proposed to treat the sheeting with aqueous solutions of sal ammoniac, potassium cyanide or copper vitriol containing cupric chloride, which should result in the copper being dissolved whilst the nickel remains unchanged in the form of small flakes suitable for admixture in the active material of alkaline accumulators. A disadvantage of this process is that it is extremely slow, a very considerable time being required for dissolving the copper, during which period the nickel layers are also attacked, resulting in their becoming crumpled. The regeneration of the above solutions is also very difficult, and their prime cost rather high. The known method of dissolving the copper by means of mixed solutions of ferric sulphate and sodium chloride, or of ferric sulphate and sulphuric acid with an addition of pyrolusite (brownstone) cannot be utilized for obtaining the nickel layers from compound sheeting of copper and nickel as the solutions in question violently attack the nickel. It is the object of the present invention to avoid all these shortcomings. It is based on the observation that an aqueous solution of ferric salts, in the absence of chlorine and free acid, rapidly dissolves metallic copper without attacking metallic nickel. According to my invention the process consists, for example, in treating the compound sheeting made up of alternating layers of copper and nickel layers in a pure solution of ferric sulphate in which the quantity of trivalent iron is at least equivalent to the copper contents, and advisably in excess of the latter. The nickel layers thus obtained, which are not attacked in any manner and retain their original flat, uncrumpled form, are then washed and dried. The solution, which now contains copper sulphate and ferrous sulphate, with possibly a rest of ferric sulphate, can be simply deprived of its copper contents and again converted into pure ferric sulphate by electrolytic means.

The dissolution of the copper can be accelerated by employing an increased temperature, for instance 80° C. and supplying air, oxygen, ozone or active oxygen in the form of persulphates. When air is employed it can be blown as a blast through the solution. The presence of compounds known as oxygen carriers or distributers, for example cerium sulphate, has been found to be favourable when oxygen is supplied in any desired form. Notwithstanding the acceleration of the dissolution of the copper by the said medium the nickel is not attacked in any manner.

What I claim is:

1. A process of obtaining nickel flakes out of compound sheeting consisting of alternating layers of copper and nickel by dissolving the copper layers in solutions of ferric salts free from chlorine and acid.

2. A process of obtaining nickel flakes out of compound sheeting consisting of alternating layers of copper and nickel by dissolving the copper layers in solutions of ferric sulphate.

3. A process of obtaining nickel flakes out of compound sheeting consisting of alternating layers of copper and nickel by dissolving the copper layers in solutions to which oxidizing means are added.

4. A process of obtaining nickel flakes out of compound sheeting consisting of alternating layers of copper and nickel by dissolving the copper layers in solutions through which a blast of air is blown.

5. A process of obtaining nickel flakes out of compound sheeting consisting of alternating layers of copper and nickel by dissolving the copper layers in solutions to which oxygen distributors are added.

6. A process of obtaining nickel flakes out of compound sheeting consisting of alternating layers of copper and nickel by dissolving the copper layers in solutions to which cerium sulphate is added.

In testimony whereof I affix my signature.

DR. EDMUND BREUNING.